US012702871B2

(12) United States Patent
Plummer

(10) Patent No.: US 12,702,871 B2
(45) Date of Patent: Aug. 11, 2026

(54) BREATHING REGULATOR BOOST TUBE

(71) Applicant: Honeywell International Inc., Charlotte, NC (US)

(72) Inventor: David Alan Plummer, Marnhull (GB)

(73) Assignee: Honeywell International Inc., Charlotte, NC (US)

( * ) Notice: Subject to any disclaimer, the term of this patent is extended or adjusted under 35 U.S.C. 154(b) by 569 days.

(21) Appl. No.: 18/364,189

(22) Filed: Aug. 2, 2023

(65) Prior Publication Data

US 2025/0041633 A1 Feb. 6, 2025

(51) Int. Cl.

| | |
|---|---|
| ***A62B 9/02*** | (2006.01) |
| ***A62B 7/02*** | (2006.01) |
| ***A62B 7/14*** | (2006.01) |
| ***B63C 11/22*** | (2006.01) |

(52) U.S. Cl.

CPC ................ *A62B 9/022* (2013.01); *A62B 7/02* (2013.01); *B63C 11/22* (2013.01); *A62B 7/14* (2013.01)

(58) Field of Classification Search

CPC .... A62B 7/02; A62B 7/04; A62B 7/12; A62B 7/14; A62B 9/022; A62B 9/025; A62B 9/027; B63C 11/22; B63C 11/2209; B63C 11/2227; B63C 11/2236; A61M 2206/11; F15D 1/025; F04D 29/667

See application file for complete search history.

(56) References Cited

U.S. PATENT DOCUMENTS

| | | | | |
|---|---|---|---|---|
| 4,257,443 A | 3/1981 | Turney | | |
| 5,343,858 A | 9/1994 | Winefordner et al. | | |
| 6,915,705 B1 * | 7/2005 | Truitt | A61M 16/0866 | 73/861.52 |
| 8,156,958 B2 | 4/2012 | Zhang et al. | | |
| 8,336,547 B1 | 12/2012 | Ritchie et al. | | |
| 10,254,772 B2 | 4/2019 | Hunt | | |

(Continued)

FOREIGN PATENT DOCUMENTS

| | | |
|---|---|---|
| CN | 105288805 B | 3/2018 |
| CN | 111569289 B | 9/2021 |

(Continued)

OTHER PUBLICATIONS

Response to Extended Search Report dated Dec. 17, 2024, from counterpart European Application No. 24187663.0 filed Mar. 5, 2025, 28 pp.

(Continued)

*Primary Examiner* — Joseph D. Boecker

(74) *Attorney, Agent, or Firm* — Shumaker & Sieffert, P.A.

(57) ABSTRACT

A breathing system includes a pressurized fluid supply, a downstream breathing device, and a fluid regulator comprising. The fluid regulator includes an inlet in fluid connection with the fluid supply, and an outlet in fluid connection with a downstream breathing device. The fluid supply supplies fluid at a first pressure to the inlet, and the fluid is at a second pressure at the outlet that is lower than the first pressure. The fluid regulator also includes a boost tube disposed within an outlet portion of the fluid regulator. The boost tube includes a body defining a length and a plurality of apertures extending through the length of the body and configured to reduce the turbulence of the fluid flowing from the outlet to the downstream breathing device.

20 Claims, 5 Drawing Sheets

(56) References Cited

U.S. PATENT DOCUMENTS

| | | | | |
|---|---|---|---|---|
| 2004/0154669 | A1* | 8/2004 | Semeia | B63C 11/2227 137/505.46 |
| 2005/0072427 | A1* | 4/2005 | Matsuoka | B63C 11/2227 128/204.26 |
| 2020/0405993 | A1 | 12/2020 | Kapust et al. | |
| 2023/0033221 | A1* | 2/2023 | Löfgren | A61M 16/0605 |
| 2023/0277797 | A1* | 9/2023 | Hogg | A61M 16/0816 128/206.26 |

FOREIGN PATENT DOCUMENTS

| | | | |
|---|---|---|---|
| DE | 202014102954 | U1 | 11/2014 |
| EP | 1447320 | B1 | 9/2010 |

OTHER PUBLICATIONS

Extended Search Report from counterpart European Application No. 24187663.0 dated Dec. 17, 2024, 9 pp.

* cited by examiner

BREATHING REGULATOR BOOST TUBE

TECHNICAL FIELD

The disclosure relates to gas regulators for a breathing apparatus.

BACKGROUND

Pressure regulating devices are essential components used in various industries to control and maintain the pressure of fluids or gases within a desired range. For example, in breathing apparatuses a pressure regulator may be used to reduce gas pressure from a supply to the mask of a user for breathing.

SUMMARY

The disclosure describes systems and techniques for providing stable fluid supply from an outlet of a fluid regulator to a breathing device. A pressurized fluid supply may connect to the inlet of the regulator, while the outlet of the fluid supply may be connected to a breathing device that requires a flow of the fluid at a different pressure than the supply, e.g., a breathing mask.

Turbulent flow of a fluid at the outlet of a regulator can prevent accurate measurement of the fluid pressure at the outlet of the regulator, hindering effective and safe operation of the regulator, as well as hindering the operation of devices downstream from the regulator. In order to ensure consistent static pressure sensed by the regulator, and to ensure sufficient fluid flow to downstream breathing devices, the regulator may include a boost tube within an outlet portion of the regulator configured to laminarize turbulent fluid flow within the outlet portion of the regulator.

In some examples, a breathing system includes a pressurized fluid supply, a downstream breathing device, and a fluid regulator. The fluid regulator includes: an inlet in fluid connection with the fluid supply, wherein the fluid supply supplies fluid at a first pressure to the inlet; an outlet in fluid connection with a downstream breathing device, wherein the fluid is at a second pressure at the outlet, and wherein the second pressure is lower than the first pressure; and a boost tube disposed within an outlet portion of the fluid regulator. The boost tube includes: a body defining a length; and a plurality of apertures extending through the length of the body and configured to reduce turbulence of the fluid flowing from the outlet to the downstream breathing device.

In some examples, a fluid regulator includes: an inlet in fluid connection with a fluid supply, wherein the fluid supply supplies fluid at a first pressure to the inlet; an outlet in fluid connection with a downstream breathing device, wherein the fluid is at a second pressure at the outlet, and wherein the second pressure is lower than the first pressure; and a boost tube disposed within an outlet portion of the fluid regulator. The boost tube includes: a body defining a length; and a plurality of apertures extending through the length of the body and configured to reduce turbulence of the fluid flowing from the outlet to the downstream breathing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
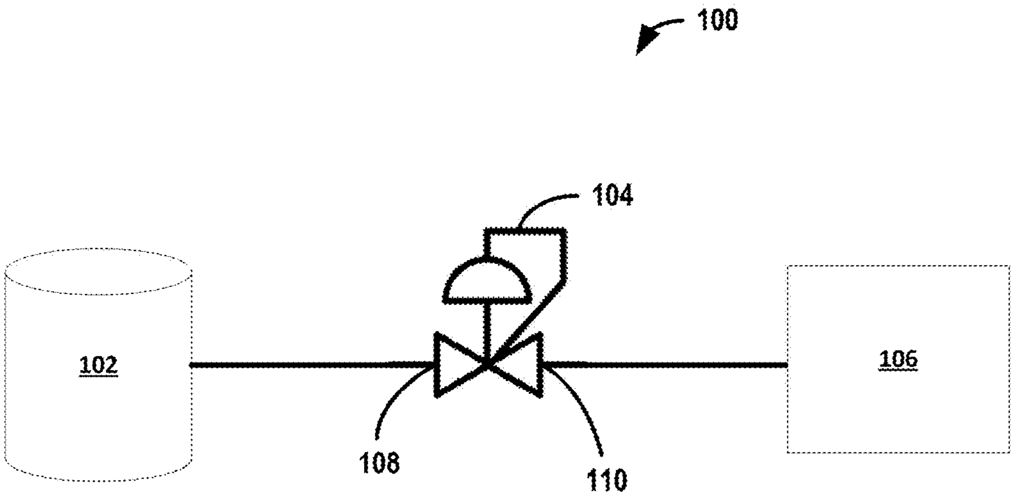
FIG. 1 is a conceptual diagram illustrating a breathing system in accordance with the techniques of this disclosure.

The disclosure describes a boost tube of a fluid regulator that includes a plurality of apertures through its length. In a fluid system, a fluid regulator controls and maintains the pressure of a fluid at the regulator's outlet within a desired range, given a supply pressure at the regulator's inlet. By adjusting the flow rate or restricting the fluid flow, the regulator can maintain a constant and controlled pressure at the outlet, regardless of variations in the input pressure.

For example, an inlet of the regulator may be connected to a pressurized fluid supply tank, while an outlet of the regulator may be in fluid connection with a breathing mask (e.g., for pilots, divers, etc.). The regulator may maintain a breathable pressure of air to the breathing mask despite depletion of pressure in the supply tank. In a typical fluid regulator, a channel (e.g., a sense port) may extend from the outlet of the regulator to the diaphragm of the regulator. The channel may be located within an outlet portion of the regulator such that the pressure in the channel is representative of the static pressure at the outlet of the regulator. The regulator may adjust the amount of fluid flowing through the regulator in response to a pressure difference across the diaphragm, where the pressure difference experienced by the diaphragm is based in part on the static pressure exerted on the diaphragm through the channel from the outlet. In this way, the regulator may maintain a constant pressure at the outlet of the regulator given changes in fluid supply pressure at the inlet of the regulator and changes in fluid demand downstream of the regulator outlet.

As fluid flows from the interior of the regulator to the outlet, restrictions and/or tortious paths through the regulator may create turbulence in the fluid flow. Turbulence in the fluid flow may prevent accurate measurement, or promote inconsistent measurement, of the fluid pressure at the outlet of the regulator, hindering effective and safe operation of the regulator, as well as hindering the operation of devices downstream from the regulator. For example, a breathing mask for a user may be unable to draw sufficient air (or other gas containing oxygen, e.g., oxygen or oxygen-enriched air) when the flow of air through the system is turbulent. In order to ensure consistent static pressure sensed by the regulator through the sense port, and to ensure sufficient fluid flow to downstream breathing devices, the regulator may include a boost tube within an outlet portion of the regulator configured to laminarize turbulent fluid flow within the outlet portion of the regulator.

The boost tube may include a substantially cylindrical restrictive orifice of a particular length within an outlet portion of the regulator, through which the fluid must flow before being sensed through the sense port or progressing to a downstream breathing device. As fluid flows through the boost tube, the flow becomes smoother and more laminar, resulting in more consistent pressure downstream. In order to laminarize the flow sufficiently for effective operation of the components of the breathing system, the fluid must flow a sufficient distance through the restrictive orifice of the boost tube, and a sufficient distance through piping downstream of the boost tube before reaching any downstream breathing devices. Otherwise, the flow may not be smooth or stable enough for effective operation of the downstream breathing device.

These required distances increase the length of both the regulator and the downstream piping in breathing systems. The increase in length may be disadvantageous in situations where space and weight is a valuable commodity, e.g., in breathing systems for pilots in the cockpit of an aircraft, or in breathing systems for divers who must carry their equipment while they swim. A reduction in length of the components of the breathing system may reduce the cost of materials for the system, reduce the energy cost to transport the breathing system, and reduce the space profile of the system.

To that end, this disclosure describes systems including a boost tube with a plurality of apertures through a length of the boost tube. By including a plurality of apertures in the boost tube, rather than just a single orifice, the boost tube may sufficiently smooth the fluid flow over a much shorter distance. This may allow the boost tube to occupy a smaller profile within the regulator, as well as reduce the length of piping necessary downstream of the boost tube to ensure smooth fluid flow and effective operation of downstream breathing devices. In this way, the boost tube described by this disclosure may reduce the total size of breathing systems that include the boost tube of this disclosure. In turn, this may reduce the amount of material necessary to construct such systems, reduce the cost of such systems, reduce the energy required to transport such systems, and increase the effectiveness and safety of the devices within the system.

FIG. 1 is a conceptual diagram illustrating breathing system 100 in accordance with the techniques of this disclosure. System 100 may include pressurized fluid supply 102, downstream breathing device 106, and fluid regulator 104. Fluid regulator 104 may include inlet 108 in fluid connection with fluid supply 102 and outlet 110 in fluid connection with downstream breathing device 106. Fluid regulator 104 may also include a boost tube (not pictured) within an outlet portion of fluid regulator 104 configured to reduce the turbulence of the fluid flowing from outlet 110 to downstream breathing device 106. In some examples, system 100 may include a breathing system, where fluid supply 102 is an oxygen supply containing fluid at a relatively high pressure, and downstream breathing device 106 is a breathing mask that requires a steady supply of oxygen at a breathable pressure.

Fluid supply 102 may supply pressurized fluid to inlet 108. For example, fluid supply 102 may include one or more compressed gas/liquid cylinders, e.g., compressed air, or compressed oxygen. In some examples, fluid supply 102 may include more than just a compressed cylinder. For example, fluid supply 102 may include an onboard oxygen generation system or a liquid oxygen system. The pressure of the fluid inside the system at inlet 108 may be referred to as the supply pressure.

Downstream breathing device 106 may include one or more devices that require pressurized fluid for operation. For example, downstream breathing device 106 may include a breathing mask. In some examples downstream breathing device 106 may include a pilot mask, a diving mask, a respirator, a mask in a self-contained breathing apparatus, or any other type of breathing mask. The pressure of the fluid necessary for effective operation of downstream breathing device 106 may be less than the supply pressure of the fluid at inlet 108. In examples where downstream breathing device 106 is a breathing mask, the breathing mask may be configured to receive a fluid at or near a comfortable breathing pressure, e.g., atmospheric pressure. Fluid regulator 104 may be configured to reduce the pressure of the fluid at inlet 108 to a lower pressure at outlet 110 suitable for the operation of downstream breathing device 106.

Fluid regulator 104 may include an internal mechanism for adjusting the amount of fluid that flows through fluid regulator from inlet 108 to outlet 110. By restricting the flow of fluid through fluid regulator 104, fluid regulator 104 may provide fluid at outlet 110 that is at a lower pressure than fluid at inlet 108. The internal mechanism may include components that adjust the amount of fluid flowing through fluid regulator 104 in response to a sensed pressure difference between a reference setpoint and outlet 110. In this way, even if the pressure from fluid supply 102 changes, or fluid demand from downstream breathing device 106 changes, fluid regulator 104 can maintain a steady supply of fluid at a specified pressure from outlet 110 to downstream breathing device 106.

For example, fluid regulator 104 may include an internal diaphragm, where a pressure difference across the diaphragm dictates how much fluid flow is restricted through fluid regulator 104. Pressure on one side of the diaphragm may be indicative of a delivery pressure, and pressure on the other side of the diaphragm may be indicative of pressure at outlet 110. In some examples, fluid regulator 104 does not include a diaphragm, but includes another mechanism for sensing pressure differences and adjusting fluid flow within fluid regulator 104 based on the sensed pressure differences. In some examples, fluid regulator 104 may include electronic pressure sensors and a solenoid used to restrict fluid flow based on a sensed pressure difference. In some examples, fluid regulator 104 may include any other mechanism known in the art for adjusting fluid flow through fluid regulator 104 in response to a sensed pressure difference between the reference setpoint and outlet 110.

Fluid regulator 104 may constantly adjust fluid flow through fluid regulator 104 in response to supply pressure changes and changes in demand from downstream breathing device 106. For example, as fluid leaves fluid supply 102 and is used by components of system 100, the pressure of fluid in fluid supply 102, and subsequently the pressure of fluid at inlet 108, may decrease. When downstream breathing device 106 is in use, downstream breathing device 106 may require a steady flow of fluid, subsequently decreasing fluid pressure at outlet 110. In some examples where system 100 is a breathing system, regulator 104 may change the target outlet pressure in order to maintain a physiological environment for the user of the breathing mask. For example, as altitude increases in an aircraft, the outlet pressure maintained by regulator 104 may be increased.

Although regulator 104 and system 100 have been described primarily with reference to breathing systems, it is understood that regulator 104 may be used in other breathing systems where a regulator is used to reduce the pressure from an inlet to an outlet and smooth outlet fluid flow is desirable.

Figure 2:
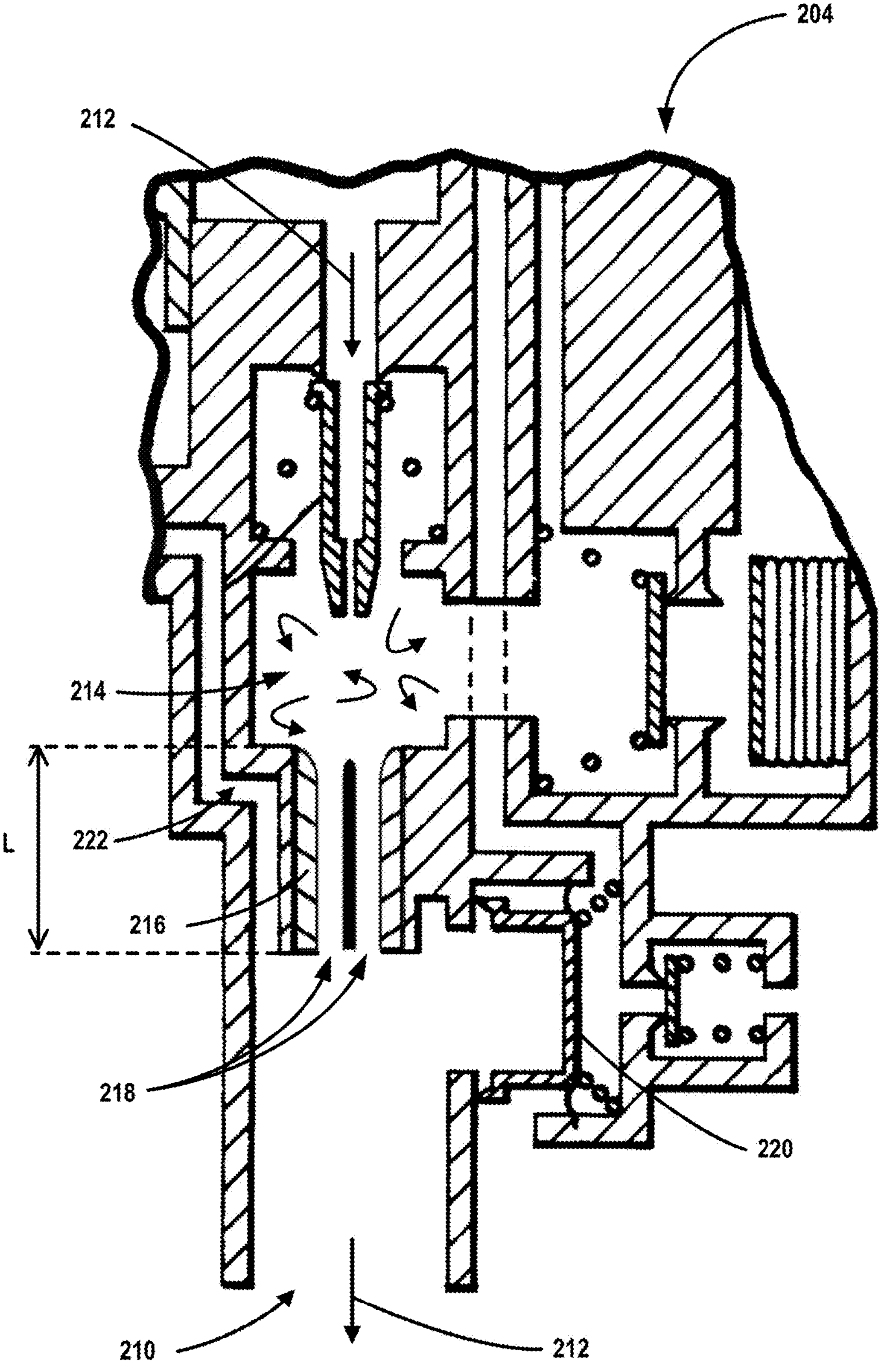
FIG. 2 is a cross-sectional side view diagram of an outlet portion of an example fluid regulator in accordance with the techniques of this disclosure.

FIG. 2 is a cross-sectional side view diagram of outlet portion 204 of an example fluid regulator (e.g., fluid regulator 104 of FIG. 1) in accordance with the techniques of this disclosure. Outlet portion 204 may include one or more components of the fluid regulator in close proximity to outlet 210 of the fluid regulator. In the example of FIG. 2, outlet portion 204 includes fluid 212 flowing through an area of high turbulence 214 before flowing through boost tube 216 and out of outlet 210. Outlet portion 204 also includes sense port 222 and vent 220.

To sense the pressure at outlet 210, sense port 222 may extend from outlet 210 to the mechanism used by the fluid regulator to control fluid flow through the regulator. Sense port 222 may be located near outlet 210 to effectively sense the fluid pressure at outlet 210. However, the fluid in outlet portion 204 may be turbulent due to the restrictions and tortious paths within the fluid regulator. The example of FIG. 2 depicts high turbulence 214 area within fluid flow 212. Turbulent flow may result in localized pressure inconsistencies near outlet 210. For example, pressure sensed at one location may be substantially different than pressure sensed at another location, or even different from pressure sensed at the same location in a different direction. Inconsistent measurement of pressure through sense port 222 may inhibit effective operation (pressure regulation) of the fluid regulator. In addition, turbulent flow may inhibit effective operation of devices downstream from outlet 210.

Outlet portion 204 includes boost tube 216. Boost tube 216 may be configured to reduce the turbulence of the fluid flowing from outlet portion 204 to downstream breathing devices. Boost tube 216 may be disposed within outlet portion 204 within the fluid path just before the fluid reaches outlet 210. In this way boost tube 216 smooths the flow of fluid before it exits the fluid regulator. As a result of this smoothing, sense port 222 may measure a consistent static pressure of the fluid within outlet portion 204 at the downstream end of boost tube 216. For example, the entrance to the channel that defines sense port 222 may be disposed within outlet portion 204 such that fluid must travel 180 degrees from the downstream end of boost tube 216 to enter the channel. A total fluid pressure in the direction of flow of the fluid may be greater than the static pressure, allowing the regulator to more consistently meet the changing fluid demands of downstream breathing devices. In this way, the regulator may maintain a constant static pressure at outlet 210 of the regulator and provide sufficient fluid to downstream breathing devices given changes in fluid supply pressure at the inlet of the regulator and changes in fluid demand downstream of outlet 210.

Boost tube 216 may include a body defining length L, and a plurality of apertures 218 extending through length L of the body. Boost tube 216 may smooth the fluid flow by forcing fluid in outlet portion 204 to pass through apertures 218 before progressing downstream. By including the plurality of apertures 218, boost tube 216 may smooth the fluid flow over a shorter length L than if boost tube 216 had only a single aperture. In some examples, length L may be three to five times the length of a diameter of boost tube 216 (e.g., first diameter $D_1$ of FIG. 4). In some examples, length L may be less than three times the length of the diameter of boost tube 216. In addition, the smoother flow may result in a shorter required distance between the downstream end of boost tube 216 and outlet 210 to ensure stable flow from outlet 210 to downstream breathing device(s). Even further, the smoother flow may result in a shorter required length of pipe or other tubing between outlet 210 and the downstream breathing device(s). This may reduce the cost of materials for the breathing system, reduce the space profile of the breathing system, and reduce the weight of the breathing system. In some examples, boost tube 216 may be substantially cylindrical, with apertures 218 passing through the length of the cylinder.

Outlet portion 204 may also include vent 220. Vent 220 may be a pressure relief valve or other safety feature designed to vent pressure in a failure scenario (e.g., diaphragm, pressure relief disk, etc.). For example, if the regulator fails to sufficiently decrease the fluid pressure from the inlet to outlet 210, pressure within outlet portion 204 at outlet 210 may become too great and damage downstream breathing devices or harm people using downstream breathing devices. In order to prevent damage to downstream breathing devices, vent 220 may be configured to release fluid from outlet portion 204 to the surrounding environment at preset pressures. Turbulent flow of the fluid can also prevent effective operation of vent 220. If the local pressure sensed at vent 220 is too low, it may not relieve pressure in outlet portion 204 before the pressure damages downstream breathing devices. If the pressure sensed at vent 220 is too high, it may vent fluid to the surroundings at the expense of necessary fluid flow to downstream breathing devices for the effective operation of the downstream breathing devices. Inconsistent pressure at vent 220 can also decrease the life of vent 220, as repeated opening and closing of vent 220 may wear out vent 220. Because boost tube 216 smooths the fluid flow, boost tube 216 ensures consistent and effective operation of vent 220.

In some examples, vent 220 may be disposed in outlet portion 204 at an opposite side of boost tube 216 from sense port 222. In some examples, vent 220 may be disposed in outlet portion 204 on the same side of boost tube 216 as sense port 222.

FIG. 2 is used for illustration only, and should not be interpreted as limiting the definition of outlet portion 204. In some examples, outlet portion 204 may have fewer or more components than depicted in FIG. 2.

Figure 3:
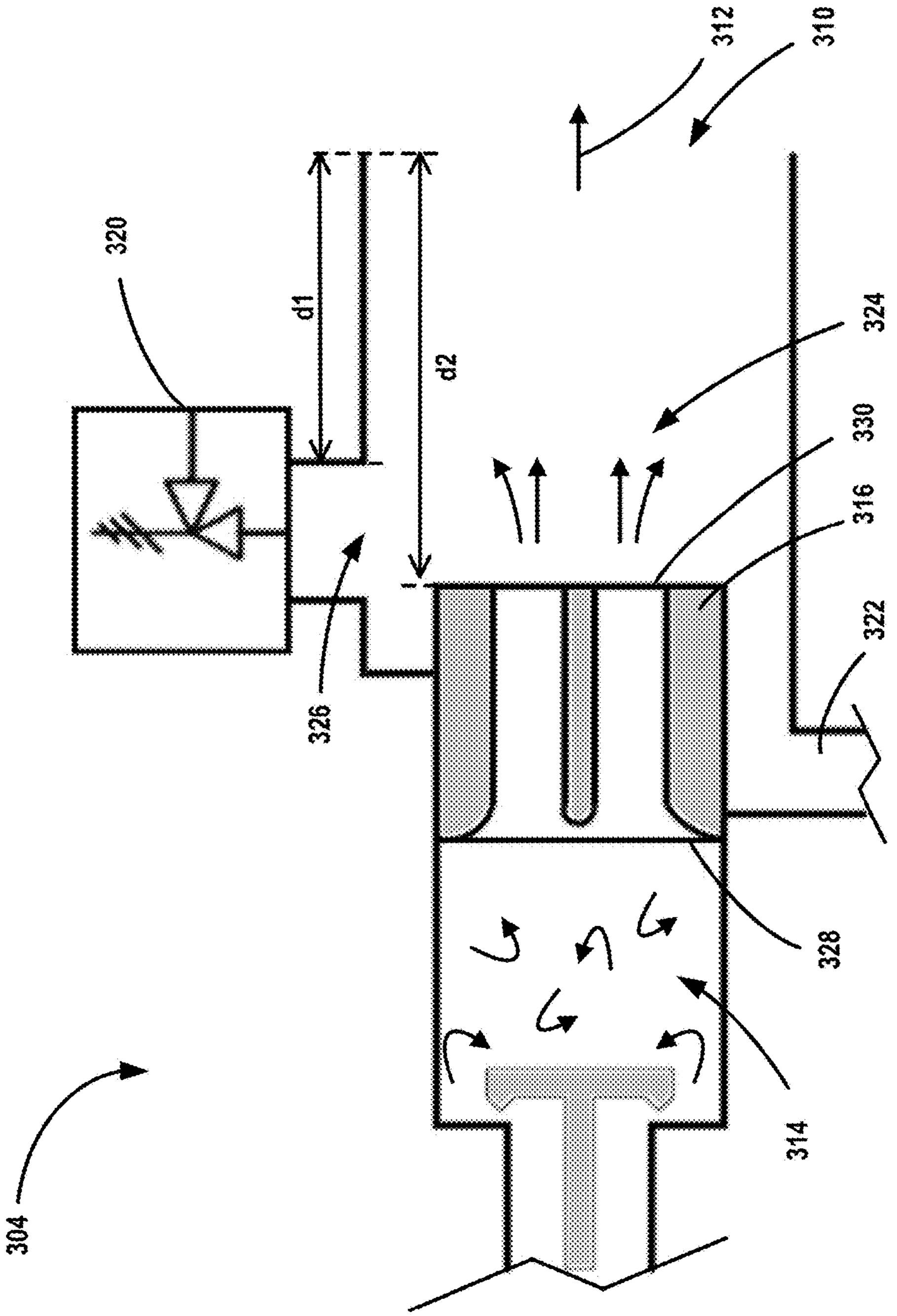
FIG. 3 is a cross-sectional side view diagram of an outlet portion of another example fluid regulator in accordance with the techniques of this disclosure.

FIG. 3 is a cross-sectional side view diagram of outlet portion 304 of another example fluid regulator in accordance with the techniques of this disclosure. In the example of FIG. 3, outlet portion 304 includes boost tube 316, outlet 310, vent 320, and sense port 322. The like-named features of FIG. 3 may be substantially the same as the respective features of FIG. 2.

Boost tube 316 may include a plurality of apertures configured to reduce the turbulence of fluid 312 flowing from outlet 310 to a downstream breathing device. In the example of FIG. 3, boost tube 316 smooths the fluid flow from high turbulence 314 flow to low turbulence 324 flow. Boost tube 316 may define an upstream end 328 and a downstream end 330. Downstream end 330 may be disposed nearer to outlet 310 than upstream end 328. Sense port 322 may measure the static pressure in outlet portion 304 at downstream end 330. Boost tube 316 may be configured to maintain the static pressure at the sense port. As described above, boost tube 316 may smooth the fluid flow in outlet portion 304, allowing accurate sensing of the static pressure and regulation of the fluid regulator. Upstream end 328 may be chamfered, rounded, or otherwise contoured to help efficiently smooth the fluid flow through boost tube 316 without causing excessive drag. The contour on upstream end 328 may further assist boost tube 316 to smooth the fluid flow. In the examples of FIGS. 1 and 3, upstream end 328 is rounded.

Vent 320 may be disposed closer to outlet 310 than downstream end 330 of boost tube 316. As discussed above, boost tube 316 smooths the fluid flow through outlet portion 304, ensuring effective operation of vent 320. In the case of a failure event, the faster that vent 320 can react to an overpressure within outlet portion 304, the more likely vent 320 is to prevent damage to downstream breathing devices. According to the techniques of the present disclose, and because boost tube 316 is able to smooth the flow over a shorter distance, fluid 312 flowing from downstream end 330 of boost tube 316 may only need to travel 90 degrees in order to pass through entrance 326 of vent 320. In examples where boost tube 316 is longer, fluid may need to travel 180 degrees from downstream end 330 of boost tube 316 to entrance 326 of vent 320, delaying the reaction time of vent 320 to overpressure events. Vent 320 may be any pressure relief device.

In the example of FIG. 3, entrance 326 to vent 320 may be disposed a distance $d_1$ away from outlet 310. In some examples, entrance 326 may define a circular cross section where one side of entrance 326 is disposed farther from outlet 310 than the other side of entrance 326. Distance $d_1$ may be measured from outlet 310 to the side of entrance 326 closer to outlet 310. Downstream end 330 of boost tube 316 may be disposed a distance $d_2$ from outlet 310, where $d_2$ is greater than $d_1$. In this way, fluid 312 flowing from downstream end 330 of boost tube 316 may only need to travel 90 degrees in order to pass through entrance 326 of vent 320. In some examples, all of entrance 326 is disposed closer to outlet 310 than downstream end 330 of boost tube 316. In some examples, one end of entrance 326 is disposed farther from outlet 310 than downstream end 330 of boost tube 316, and the other end of entrance 326 is disposed closer to outlet 310 than downstream end 330 of boost tube 316.

FIG. 3 is used for illustration only, and should not be interpreted as limiting the definition of outlet portion 304. In some examples, outlet portion 304 may have fewer or more components than depicted in FIG. 3.

Figure 4:
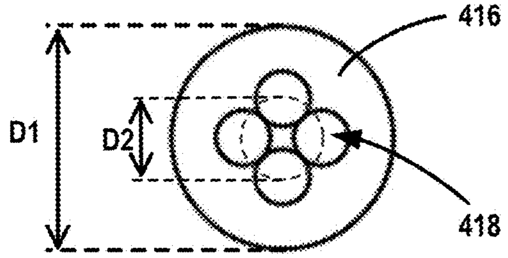
FIG. 4 is a conceptual diagram illustrating an inline view of an example boost tube with a plurality of apertures in accordance with the techniques of this disclosure.

FIG. 4 is a conceptual diagram illustrating an inline view of example boost tube 416 with a plurality of apertures 418 in accordance with the techniques of this disclosure. Boost tube 416 may be substantially similar to boost tube 316 of FIG. 3 and/or boost tube 216 of FIG. 2. Apertures 418 may be substantially similar to apertures 218 of FIG. 2.

Boost tube 416 may define a substantially cylindrical shape, wherein a cross-section of the body of boost tube 416 defines a substantially circular profile. The perimeter of the substantially circular profile may define a first diameter $D_1$. Apertures 418 may include at least two apertures arranged equidistant from one another around a circle with diameter $D_2$. The circle may be concentric with the profile of boost tube 416, and second diameter $D_2$ may be smaller than first diameter $D_1$. In some examples, a body of boost tube 416 may define a length (e.g., length L of FIG. 2). The length of boost tube 416 may be related to first diameter $D_1$. For example, the length may be three to five times first diameter $D_1$. In some examples, the length may be less than three times first diameter $D_1$.

In the example of FIG. 4, boost tube 416 includes four apertures 418 arranged equidistant around the circle with second diameter $D_2$. In some examples, boost tube 416 includes more or fewer apertures 418 arranged around one or more circles with diameters smaller than first diameter $D_1$. For example, a first plurality of apertures may be disposed equidistant around the circle with second diameter $D_2$, and a second plurality of apertures may be disposed equidistant around a second circle with a third diameter, where the third diameter is larger or smaller than second diameter $D_2$, but still smaller than first diameter $D_1$.

In some examples, boost tube 416 may be constructed partially or entirely of metal, for example, aluminum. In some examples, boost tube 416 may be formed partially or entirely from a polymer.

Figure 5A:
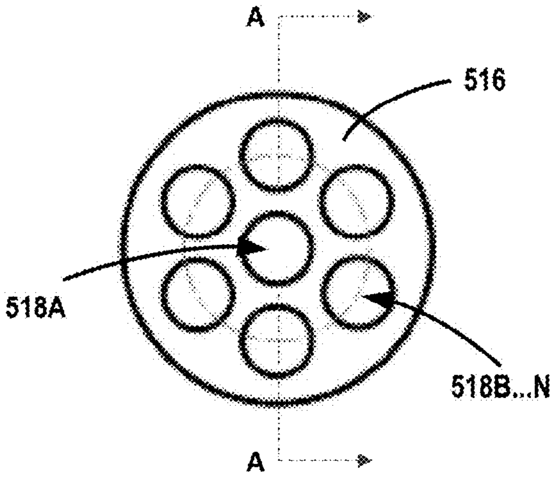
FIG. 5A is conceptual diagram illustrating an inline view of another example boost tube with a plurality of apertures in accordance with the techniques of this disclosure.

FIG. 5A is conceptual diagram illustrating an inline view of another example boost tube 516 with a plurality of apertures 518A-N, in accordance with the techniques of this disclosure. Boost tube 516 may be substantially similar to boost tube 316 of FIG. 3 and/or boost tube 216 of FIG. 2, except as described herein.

Boost tube 516 may define a substantially cylindrical shape, wherein a cross-section of the body of boost tube 516 defines a substantially circular shape. Boost tube 516 may include a plurality of apertures 518A-N, wherein at least one of the plurality of apertures 518A-N is disposed at a center of the substantially circular shape. In the example of FIG. 5A, aperture 518A is disposed substantially at the center of boost tube 516. Boost tube 516 of FIG. 5A further includes apertures 518B-N disposed equidistant in a circle smaller than the perimeter of boost tube 516. In some examples, boost tube 516 may include any number of apertures 518A-N. For example, boost tube 516 of FIG. 5A includes seven apertures. In some examples, the boost tubes of this disclosure may include more or fewer apertures (e.g., four, five, or twelve).

Figure 5B:
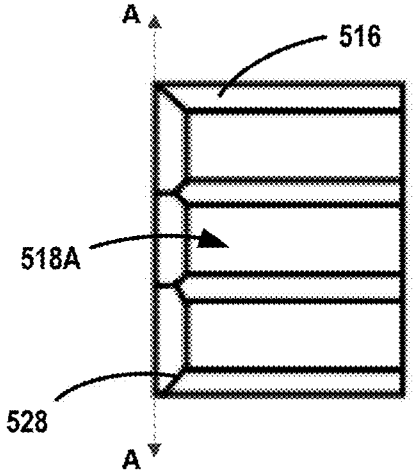
FIG. 5B is a cross-sectional side view diagram of the example boost tube of FIG. 5A in accordance with the techniques of this disclosure.

FIG. 5A also shows cross section A-A, which can be viewed in FIG. 5B. FIG. 5B is a cross-sectional side view diagram of boost tube 516 of FIG. 5A, in accordance with the techniques of this disclosure. Boost tube 516 may define a length (e.g., length L of FIG. 2), wherein apertures 518A-N extend through the length of the boost tube 516. For example, apertures 518A-N define hollow channels through which fluid may flow from one side of boost tube 516 to the other. Aperture 518A is shown in the center of boost tube 516.

Boost tube 516 may include a chamfered, rounded, or otherwise contoured inlet 528 to help efficiently smooth the fluid flow through boost tube 516 without causing excessive drag. In the example of FIG. 5B, inlet 528 is chamfered. In some examples, each aperture of apertures 518A-N may be contoured on the upstream end of boost tube 516. In some examples, boost tube 516 may only be contoured along an outer edge of the upstream end of boost tube 516. A downstream end of boost tube 516 may be substantially flat, such that there is a sharp corner around the edges of apertures 518A-N at the downstream end.

Figure 6:
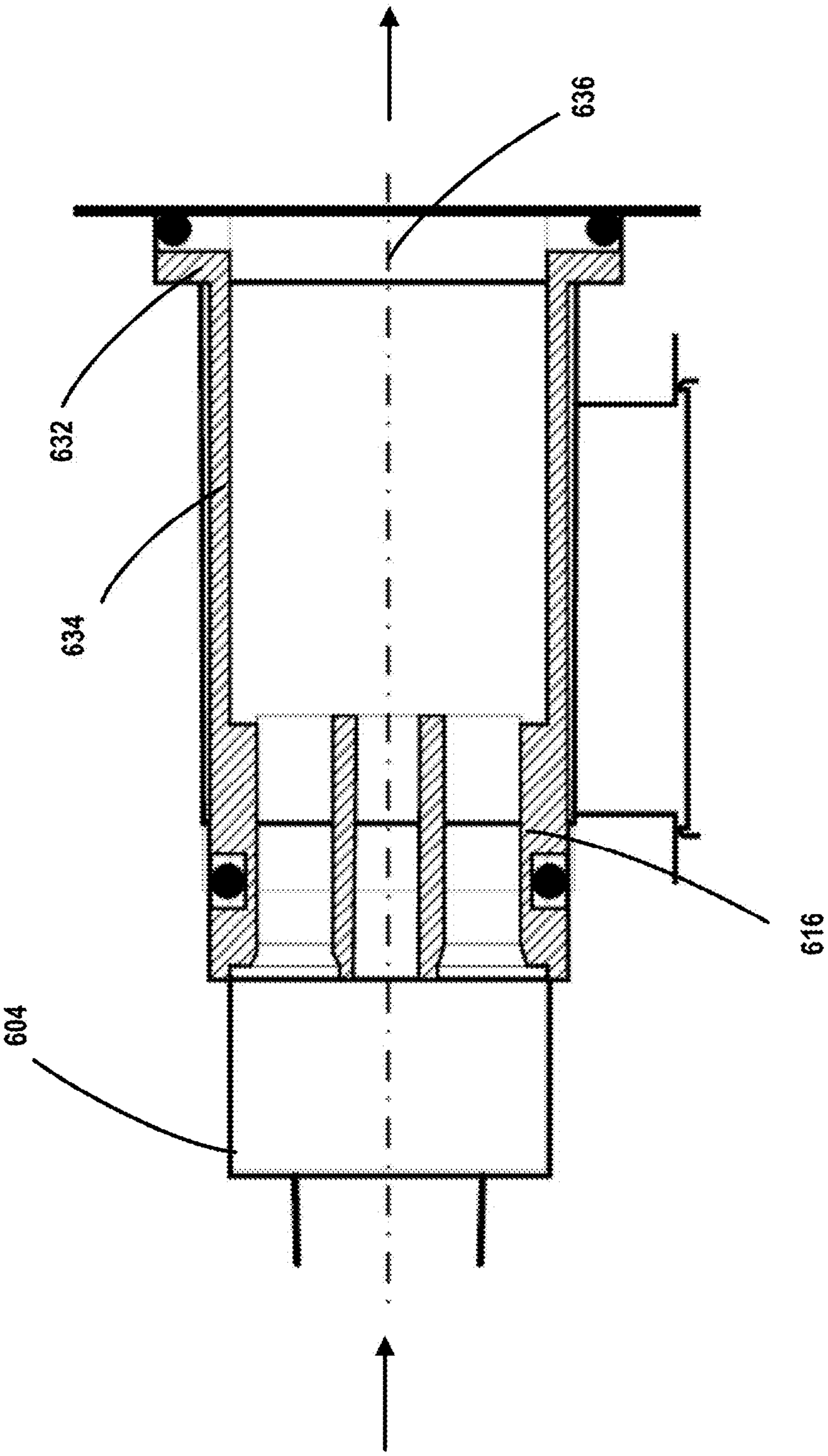
FIG. 6 is a cross-sectional side view diagram of an example boost tube and adapter installed in a regulator in accordance with the techniques of this disclosure.

FIG. 6 is a cross-sectional side view diagram of example boost tube 616 and adapter 632 installed in regulator 604, in accordance with the techniques of this disclosure. Regulator 604 may be substantially similar to regulator 104. Boost tube 616 may be substantially similar to boost tubes described in reference to other figures, except as described herein. In some examples, boost tube 616 may be installed in existing regulators (e.g., regulator 604) or breathing systems without changing the structure of the existing regulators or breathing systems. As boost tube 616 may be shorter than boost tubes of previous disclosures, regulator 604 may include adapter 632 to attach boost tube 616 to the outlet portion of regulator 604.

Adapter 632 may be configured to attach boost tube 616 to existing attachment points within regulator 604 to allow shorter boost tube 616 to operate in legacy regulators. For example, adapter 632 may include one or more legs 634 configured to attach to an interior of regulator 604. In some examples, boost tube 616 attaches inside adapter 632. In some examples, adapter 632 and legs 634 are integrated into boost tube 616. Boost tube 616 may define a body defining a length (e.g., length L of FIG. 2), wherein the length defines longitudinal axis 636. Legs 634 may extend from boost tube 616 parallel to longitudinal axis 636 until the reach the existing attachment points in regulator 604. The attachment points in regulator 604 may be o-ring seats or any other suitable attachment mechanism.

In some examples, adapter 632 defines a substantially cylindrical shape with boost tube 616 disposed within the substantially cylindrical shape. In some examples, adapter 632 includes only legs 634 extending from boost tube 616 to the attachment points, such that fluid may flow perpendicular to longitudinal axis 636 along a length of adapter 632 downstream of boost tube 616. In this way, regulator 604 may see some of the benefits of having shorter boost tube 616 without including a shorter outlet portion itself, or being installed with shorter outlet piping/tubing. For example, fluid flowing out of boost tube 616 may only need to turn 90 degrees to enter a vent or other pressure relief device.

The following numbered examples demonstrate one or more aspects of the disclosure.

Example 1: A breathing system including: a pressurized fluid supply; a downstream breathing device; and a fluid regulator including: an inlet in fluid connection with the fluid supply, wherein the fluid supply supplies fluid at a first pressure to the inlet; an outlet in fluid connection with a downstream breathing device, wherein the fluid is at a second pressure at the outlet, and wherein the second pressure is lower than the first pressure; and a boost tube disposed within an outlet portion of the fluid regulator and including: a body defining a length; and a plurality of apertures extending through the length of the body and configured to reduce turbulence of the fluid flowing from the outlet to the downstream breathing device.

Example 2: The breathing system of example 1, wherein the boost tube further includes a chamfered inlet.

Example 3: The breathing system of example 1, wherein the boost tube further includes a rounded inlet.

Example 4: The breathing system of example 1, wherein a cross-section of the body of the boost tube defines a substantially circular profile with a first diameter, and wherein the plurality of apertures include at least two apertures arranged equidistant from one another around a circle concentric with the profile, wherein the circle has a second diameter smaller than the first diameter.

Example 5: The breathing system of example 1, wherein a cross-section of the body of the boost tube defines a substantially circular shape, and wherein at least one of the plurality of apertures is disposed at a center of the substantially circular shape.

Example 6: The breathing system of example 1, wherein the downstream breathing device includes a breathing mask.

Example 7: The breathing system of example 1, wherein the fluid regulator further includes an adapter attached to the boost tube, wherein the adapter includes one or more legs configured to attach the boost tube to the fluid regulator within the outlet portion.

Example 8: The breathing system of example 7 wherein the length of the body defines a longitudinal axis, and wherein the one or more legs extend from an end of the boost tube parallel to the longitudinal axis.

Example 9: The breathing system of example 1, wherein the boost tube defines a first end and a second end, wherein the second end is disposed nearer to the outlet than the first end; wherein the outlet portion further includes a pressure relief device in fluid connection with the boost tube, wherein an entrance to the pressure relief device is disposed nearer to the outlet than the second end of the boost tube.

Example 10: The breathing system of example 1, wherein the fluid regulator further includes a sense port in the outlet portion, wherein the boost tube is configured to maintain a static pressure at the sense port.

Example 11: A fluid regulator including: an inlet in fluid connection with a fluid supply, wherein the fluid supply supplies fluid at a first pressure to the inlet; an outlet in fluid connection with a downstream breathing device, wherein the fluid is at a second pressure at the outlet, and wherein the second pressure is lower than the first pressure; and a boost tube disposed within an outlet portion of the fluid regulator and including: a body defining a length; and a plurality of apertures extending through the length of the body and configured to reduce turbulence of the fluid flowing from the outlet to the downstream breathing device.

Example 12: The fluid regulator of example 11, wherein the boost tube further includes a chamfered inlet.

Example 13: The fluid regulator of example 11, wherein the boost tube further includes a rounded inlet.

Example 14: The fluid regulator of example 11, wherein a cross-section of the body of the boost tube defines a substantially circular profile with a first diameter, and wherein the plurality of apertures include at least two apertures arranged equidistant from one another around a circle concentric with the profile, wherein the circle has a second diameter smaller than the first diameter.

Example 15: The fluid regulator of example 11, wherein a cross-section of the body of the boost tube defines a substantially circular shape, and wherein at least one of the plurality of apertures is disposed at a center of the substantially circular shape.

Example 16: The fluid regulator of example 11, wherein the downstream breathing device includes a breathing mask.

Example 17: The fluid regulator of example 11, wherein the fluid regulator further includes an adapter attached to the boost tube, wherein the adapter includes one or more legs configured to attach the boost tube to the fluid regulator within the outlet portion.

Example 18: The fluid regulator of example 17, wherein the length of the body defines a longitudinal axis, and wherein the one or more legs extend from an end of the boost tube parallel to the longitudinal axis.

Example 19: The fluid regulator of example 11, wherein the boost tube defines a first end and a second end, wherein the second end is disposed nearer to the outlet than the first end; wherein the outlet portion further includes a pressure relief device in fluid connection with the boost tube, wherein an entrance to the pressure relief device is disposed nearer to the outlet than the second end of the boost tube.

Example 20: The fluid regulator of example 11, wherein the fluid regulator further includes a sense port in the outlet portion, and wherein the boost tube is configured to maintain a static pressure at the sense port.

Example 21: The fluid regulator of example 11, wherein a cross-section of the body of the boost tube defines a substantially circular profile with a diameter, wherein the length defined by the body of the boost tube is less than three times the diameter.

Various examples have been described. These and other examples are within the scope of the following claims.

What is claimed is:

1. A breathing system comprising:
a pressurized fluid supply;
a downstream breathing device; and
a fluid regulator comprising:
an inlet in fluid connection with the fluid supply, wherein the fluid supply supplies fluid at a first pressure to the inlet;
an outlet in fluid connection with the downstream breathing device, wherein the fluid is at a second pressure at the outlet, and wherein the second pressure is lower than the first pressure; and
a boost tube disposed within an outlet portion of the fluid regulator and comprising:
a body defining a length; and
a plurality of cylindrical apertures extending through the length of the body and configured to reduce turbulence of the fluid flowing from the outlet to the downstream breathing device.

2. The breathing system of claim 1, wherein the boost tube further comprises a chamfered inlet.

3. The breathing system of claim 1, wherein the boost tube further comprises a rounded inlet.

4. The breathing system of claim 1, wherein a cross-section of the body of the boost tube defines a substantially circular profile with a first diameter, and wherein the plurality of apertures comprise at least two apertures arranged equidistant from one another around a circle concentric with the profile, wherein the circle has a second diameter smaller than the first diameter.

5. The breathing system of claim 1, wherein a cross-section of the body of the boost tube defines a substantially circular shape, and wherein at least one of the plurality of apertures is disposed at a center of the substantially circular shape.

6. The breathing system of claim 1, wherein the downstream breathing device comprises a breathing mask.

7. The breathing system of claim 1, wherein the fluid regulator further comprises an adapter attached to the boost tube, wherein the adapter comprises one or more legs configured to attach the boost tube to the fluid regulator within the outlet portion.

8. The breathing system of claim 7, wherein the length of the body defines a longitudinal axis, and wherein the one or more legs extend from an end of the boost tube parallel to the longitudinal axis.

9. The breathing system of claim 1,
wherein the boost tube defines a first end and a second end, wherein the second end is disposed nearer to the outlet than the first end;
wherein the outlet portion further comprises a pressure relief device in fluid connection with the boost tube, wherein an entrance to the pressure relief device is disposed nearer to the outlet than the second end of the boost tube.

10. The breathing system of claim 1, wherein the fluid regulator further comprises a sense port in the outlet portion, wherein the boost tube is configured to maintain a static pressure at the sense port.

11. A fluid regulator comprising:
an inlet configured to be in fluid connection with a fluid supply, wherein the fluid supply supplies fluid at a first pressure to the inlet;
an outlet configured to be in fluid connection with a downstream breathing device, wherein the fluid is at a second pressure at the outlet, and wherein the second pressure is lower than the first pressure; and
a boost tube disposed within an outlet portion of the fluid regulator and comprising:
a body defining a length; and
a plurality of cylindrical apertures extending through the length of the body and configured to reduce turbulence of the fluid flowing from the outlet to the downstream breathing device.

12. The fluid regulator of claim 11, wherein the boost tube further comprises a chamfered inlet.

13. The fluid regulator of claim 11, wherein the boost tube further comprises a rounded inlet.

14. The fluid regulator of claim 11, wherein a cross-section of the body of the boost tube defines a substantially circular profile with a first diameter, and wherein the plurality of apertures comprise at least two apertures arranged equidistant from one another around a circle concentric with the profile, wherein the circle has a second diameter smaller than the first diameter.

15. The fluid regulator of claim 11, wherein a cross-section of the body of the boost tube defines a substantially circular shape, and wherein at least one of the plurality of apertures is disposed at a center of the substantially circular shape.

16. The fluid regulator of claim 11, wherein the downstream breathing device comprises a breathing mask.

17. The fluid regulator of claim 11, wherein the fluid regulator further comprises an adapter attached to the boost tube, wherein the adapter comprises one or more legs configured to attach the boost tube to the fluid regulator within the outlet portion.

18. The fluid regulator of claim 17, wherein the length of the body defines a longitudinal axis, and wherein the one or more legs extend from an end of the boost tube parallel to the longitudinal axis.

19. The fluid regulator of claim 11,
wherein the boost tube defines a first end and a second end, wherein the second end is disposed nearer to the outlet than the first end; and
wherein the outlet portion further comprises a pressure relief device in fluid connection with the boost tube, wherein an entrance to the pressure relief device is disposed nearer to the outlet than the second end of the boost tube.

20. The fluid regulator of claim 11, wherein the fluid regulator further comprises a sense port in the outlet portion, and wherein the boost tube is configured to maintain a static pressure at the sense port.

* * * * *